United States Patent [19]

Evans et al.

[11] 4,029,858

[45] June 14, 1977

[54] ELECTRIC CELLS

[75] Inventors: Leslie Samuel Evans, Reading; Trevor Leslie Markin, Goring-on-Thames; Ronald Michael Dell, Abingdon; Albert George Montgomery, Reading, all of England

[73] Assignee: The Secretary of State for Industry in Her Britannic Majesty's Government of the United Kingdom of Great Britain and Northern Ireland, England

[22] Filed: Nov. 17, 1975

[21] Appl. No.: 632,783

[30] Foreign Application Priority Data

Nov. 19, 1974 United Kingdom ............ 50058/74

[52] U.S. Cl. ................................................ 429/104
[51] Int. Cl.² ........................................... H01M 4/36
[58] Field of Search ............... 136/6 F, 6 FS, 6 R, 136/20, 83 R, 100 R, 153; 429/104

[56] References Cited

UNITED STATES PATENTS

| 3,413,150 | 11/1968 | Kummer et al. | 136/6 FS |
| 3,468,709 | 9/1969 | Kummer | 136/6 F |
| 3,533,848 | 10/1970 | Winn | 136/6 F |
| 3,749,603 | 7/1973 | Stringham et al. | 136/6 F |
| 3,811,943 | 5/1974 | Minck et al. | 136/6 FS |
| 3,922,176 | 11/1975 | Robinson et al. | 136/6 FS |

Primary Examiner—Anthony Skapars
Attorney, Agent, or Firm—Larson, Taylor and Hinds

[57] ABSTRACT

In an electric cell having a solid electrolyte and employing sodium as the liquid anode and sulphur as the liquid cathode, the liquid anode is contained in two compartments separated by a corrosion resistant barrier. Liquid anode is arranged to flow between the compartments through a flow restrictor which permits a rate of flow sufficient to meet the normal charge and discharge requirements of the cell but limits higher rates of flow.

One of the compartments has a very limited capacity for liquid sodium and is disposed about one side of the solid electrolyte to define a wicking space to constrain liquid sodium to flow over the solid electrolyte. The other compartment provides a reservoir for containing the bulk of the liquid sodium.

In the event of damage to the solid electrolyte, only a very limited amount of liquid sodium is readily available to mix and react with the liquid sulphur.

8 Claims, 5 Drawing Figures

ELECTRIC CELLS

BACKGROUND TO THE INVENTION

This invention relates to electric cells employing a liquid anode, a liquid cathode and a solid electrolyte, and in particular to electric cells having a solid electrolyte which partially bounds on one side a compartment for liquid anode and on the opposite side a compartment for liquid cathode, examples of such cells being shown in co-pending patent applications Ser. Nos. 556,500 and 591,321.

A potential hazard associated with such electric cells is that resulting from uncontrolled mixing of the liquid anode and the liquid cathode in the event of damage to the solid electrolyte which normally separates them in the cell. For example, when liquid sodium is allowed to run freely into liquid sulphur, a very rapid reaction occurs with the formation of highly corrosive sodium polysulphides, and much heat is evolved which in an electric cell could lead to rapid corrosion and melting of metallic components, to a fire, and even to an explosion.

It is therefore an object of the present invention to reduce the likelihood of such a hazardous situation being realised in the event of damage to the solid electrolyte in the aforedescribed cells.

SUMMARY OF THE PRESENT INVENTION

According to the present invention, in an electric cell having a solid electrolyte which partially bounds on one side a compartment for a liquid anode and on its opposite side a compartment for liquid cathode, the compartment for liquid anode is shaped so that it generally follows the contour of the surface of the solid electrolyte and defines a wicking space for liquid anode of very limited capacity about said surface so that the liquid anode compartment can only contain a very limited quantity of the liquid anode needed by the cell, a reservoir in which the bulk of the liquid anode needed for the cell is arranged to be stored, a corrosion resistant barrier between the liquid anode compartment and the reservoir, and a flow limiting means connecting the liquid anode compartment and the reservoir through the barrier, said means being adapted to permit flow therethrough of anode liquid for the normal charge and discharge operational requirements of the cell but to limit higher rates of flow, whereby in the event of damage to the solid electrolyte, only a very limited quantity of liquid anode is readily available to react with the liquid cathode and further supply of liquid anode is limited by the flow limiting means.

Foam material such as porous Nichrome or Torvec ceramic may be disposed in the reservoir so as to provide a secondary containment of the liquid anode.

BRIEF EXPLANATION OF THE DRAWINGS

To enable the present invention to be more readily understood, several electric cells in accordance with the invention will now be described by way of example only and with reference to the accompanying drawings, in which.

In all the above Figures like parts have like numerals.

DETAILED DESCRIPTION OF THE INVENTION

Figure 1:
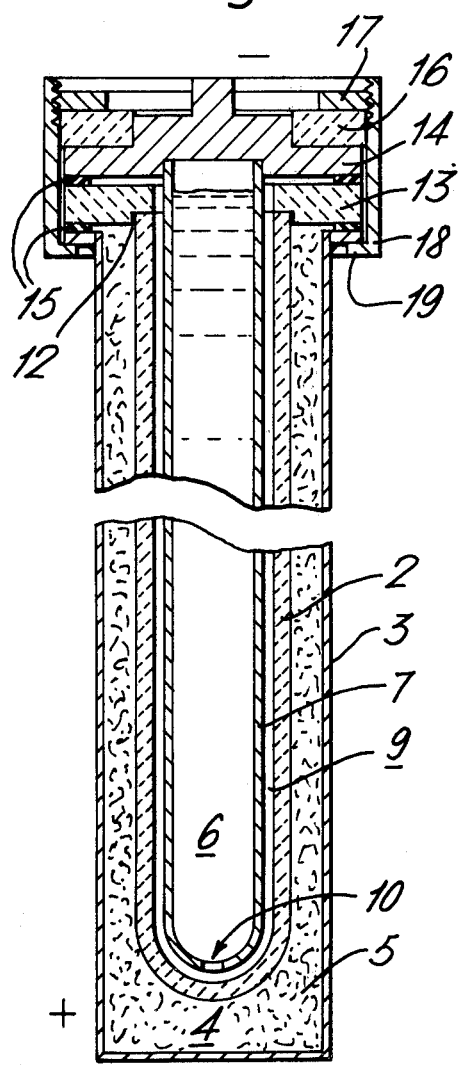
FIG. 1 shows a sectional representation of an electric cell of tubular form.

Referring now to FIG. 1, the electric cell shown is of circular form in section and has a tubular beta-alumina solid electrolyte 2 disposed within a flanged stainless steel casing 3 to define an outer compartment 4 for liquid sulphur impregnated in a graphite felt 5.

A corrosion resistant barrier in the form of a molybdenum tube 7 is disposed adjacent to and within the solid electrolyte 2 to define a compartment for liquid anode in the form of a shallow wicking space 9 (shown exaggerated for clarity) which follows the contour of the solid electrolyte 2 and acts as a wicking means to constrain liquid sodium to flow therethrough by capillary action over the surface of the solid electrolyte 2. An internal reservoir 6 for sodium is provided inside the tube 7. The radial dimension of the wicking space 9 depends on the height to which the liquid sodium has to be raised, and may vary from about 0.1 to 0.5 mm. For example, a radial dimension of 0.25 mm has been found adequate to raise liquid sodium to a height of about 150 mm.

Liquid sodium enters the wicking space 9 through a port means in the form of a relatively small hole 10 at the otherwise closed end of the tube 7. The dimensions of the hole 10 are selected so that its resistance to flow of liquid sodium permits a rate of flow therethrough into the wicking space 9 adequate to meet the designed electric discharge and charge requirements of the cell from electrochemical reactions between the liquid sodium and liquid sulphur, but acts as such a restriction on flow at higher flow rates that it limits the flow of liquid sodium to a rate not likely to lead to the aforesaid hazardous consequences in the event of damage to the solid electrolyte 2. A hole 10 diameter of between 1½ mm to 3 mm has been found adequate for a range of electric cells having a solid electrolyte of 3 cm mean diameter and energy capacities of between 250 to 400 watt.hrs.

The aforedescribed parts of the electric cell are assembled and secured together by methods familiar to those skilled in the art of manufacturing electric cells of the kind described.

In one arrangement as shown in FIG. 1, the solid electrolyte 2 is joined by a glass frit seal 12 to an alpha-alumina spacer disc 13, whilst the tube 7 is welded to a molybdenum end disc 14. "Grafoil" compression seals 15 are disposed between the flanged end of the tube 7 and the spacer disc 13, and between the spacer disc 13 and the end disc 14. An alpha-alumina insulating disc 16 is disposed between the end disc 14 and an externally threaded low alloy steel insert 17 which locates inside the threaded bore of a stainless steel clamping sleeve 18. The clamping sleeve 18 has a lip 19 which bears against the flanged end of the casing 3 to clamp the aforesaid parts of the cell together. The positive terminal of the cell is provided by the casing 3, whilst the negative terminal is provided by the end disc 14.

The cell operates in the known manner of electric cells of the kind described, but has the safety feature of the wicking space 9 and the hole 10 in the corrosion resistant tube 7 to reduce the quantity of sodium adjacent to the solid electrolyte 2, and restrict the rate at which liquid sodium can flow into the wicking space 9. This imposes a limitation on the amount of liquid sodium readily available to react with the liquid sulphur in the event of damage to the solid electrolyte 2, and also ensures that any hot sodium polysulphides from this reaction which might leak into the wicking space 9 are separated by the corrosion resistant tube 7 from the bulk of the sodium in the cell.

The invention is not limited to the use of a single hole 10 to limit the rate at which the liquid anode can flow therethrough, and a plurality of holes may be used provided that they perform the same limiting function. In some applications it may for example be advantageous to provide several such holes distributed about the surface of the tube 7. For example, the position at which the hole 10 should be made depends on the orientation at which the cell is designed to operate. For operating with the axes of the tubular solid electrolyte 2 and tube 7 horizontal, the hole 10 should be made at the lower periphery of the tube 7 to ensure that it is always submerged as the level of liquid sodium in the compartment 6 falls during discharge of the cell.

Figure 2:
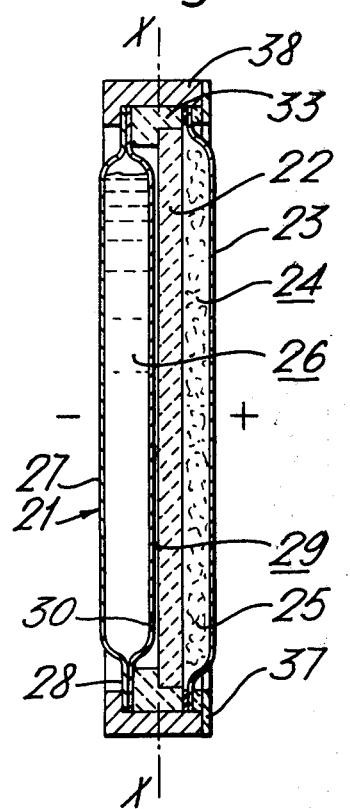
FIG. 2 shows a sectional representation of an electric cell of flat form.

Referring now to FIG. 2, this electric cell of the kind described is of flat form and round in section about the line X—X, and has a flat circular beta-alumina solid electrolyte 22 disposed adjacent to the circular opening of a shallow stainless steel dished casing 23 to define a compartment 24 for liquid sulphur impregnated in a graphite felt 25.

A reservoir 26 for liquid sodium is provided inside a molybdenum flat-sided capsule 27 having an annular flange 28. The capsule 27 is disposed adjacent to the solid electrolyte 22 to define a compartment for liquid sodium in the form of a shallow wicking space 29 to constrain liquid sodium to flow over the adjacent surface of the solid electrolyte 22, and is separated from the liquid anode in the reservoir 26 by the corrosion resistant barrier provided by the capsule 27. Liquid sodium enters the wicking space 29 through a small hole 30 in the capsule 27, the hole 30 acting to limit the flow of sodium therethrough, and performs the same function as the hole 10 in FIG. 1.

Figure 2A:
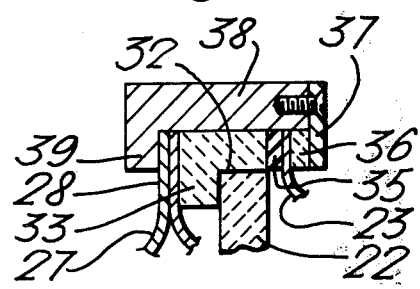
FIG. 2a shows to an enlarged scale the clamping arrangement of the electric cell shown in FIG. 2.

The aforedescribed parts of the electric cell are assembled and secured together by methods familiar to those skilled in the art of maufacturing electric cells of the kind described. For example, as shown to an enlarged scale in FIG. 2a, the solid electrolyte 22 is joined by a glass frit seal 32 to a circular recess in a hollow alpha-alumina spacer 33.

The flanged end 28 of the capsule 27 is brazed with ceramic to metal braze to one side of the spacer 33. The casing 23 is disposed at the opposite side of the spacer 33 using a "Grafoil" compression seal 35 and an alpha-alumina insulating gasket 36, and clamped between a stainless steel clamping plate 37 and location body 38, the body 38 having a lip 39 which bears against the flange 28 of the capsule 27.

The positive terminal of the cell is provided by the casing 23, whilst the negative terminal is provided by the capsule 27.

The cell also acts in the known manner of cells of the kind described but has similar safety features to those described in relation to FIG. 1.

As previously mentioned in relation to FIG. 1, a plurality of holes may be used as an alternative to the single hole 30, the positions of such holes depending to a certain extent on the orientation in which the cell has been designed to operate.

The relative position of the liquid sodium and liquid sulphur about the solid electrolyte in cells of the kind described may be transposed from that shown in FIG. 1 to that shown for example in co-pending application Ser. No. 556,500. The invention can be incorporated in such transposed cells, as shown for example in FIG. 3.

Figure 3:
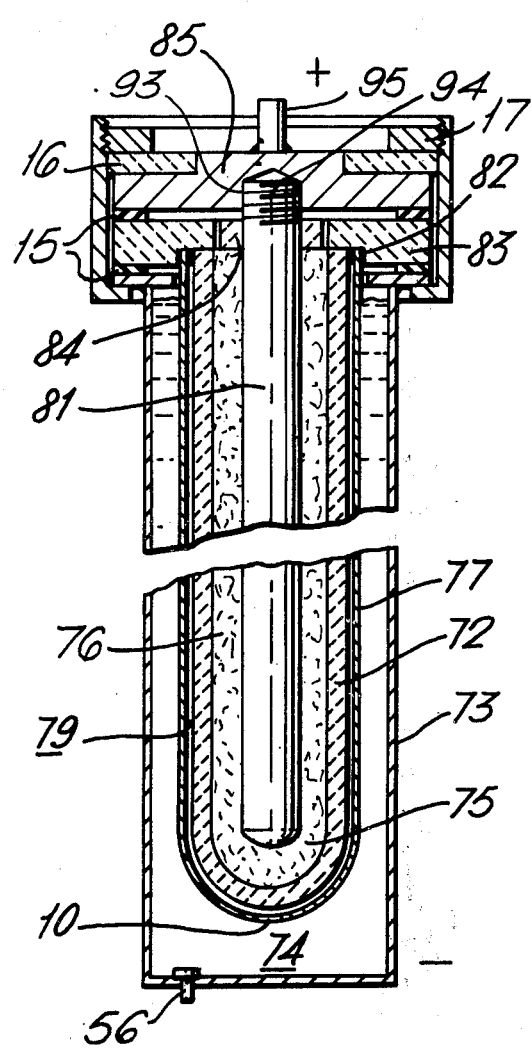
FIG. 3 shows a sectional representation of an electric cell similar to that shown in FIG. 1 but having the relative positions of the liquid anode and liquid cathode within the cell transposed.

Referring now to FIG. 3, the electric cell shown is of circular form in section and has a beta-alumina solid electrolyte 72 disposed within a flanged stainless steel casing 73 to define a reservoir 74 for liquid sodium. A compartment 76 for liquid sulphur impregnated in a graphite felt 75 is provided by the inside space 76 in the tubular solid electrolyte 72.

A molybdenum tube 77 to provide a corrosion resistant barrier is disposed adjacent to and surrounds the solid electrolyte 72 and defines a compartment for liquid anode in the form of a shallow wicking space 79 which acts as a wicking means to constrain liquid sodium to flow over the surface of the solid electrolyte 72. Liquid sodium enters the wicking space 79 through a relatively small hole 80 at the otherwise closed end of the tube 77, the dimensions of the hole 80 being selected to limit the flow of liquid sodium in the same manner as the hole 10 in FIG. 1. The solid electrolyte 72 and tube 77 are joined by glass frit seals 82 to an alpha-alumina spacer disc 83. A current collector 81 in the form of a graphite rod extends into the compartment 76 and has a threaded end 94 held by a threaded hole 93 in a stainless steel end disc 85. An alpha-alumina spacing disc 84 is disposed between the graphite felt 75 and the end disc 85. A stainless steel rod welded to the outside of the end disc 85 provides the positive terminal 95.

A stainless steel negative terminal 56 is welded to and extends through the casing 73. As a further protection against corrosion, the inside surface of the casing 73 may be coated initially with Nichrome to a depth of about 0.003 inches and then with alumina containing about 2% titania to a depth of about 0.020 inches. Naturally that portion of the terminal 56 inside the casing 73 may be coated with Nichrome but not with the electrically insulating alumina/titania coating.

In other respects the electric cell follows the design principles of the cell shown in FIG. 1.

Figure 4:
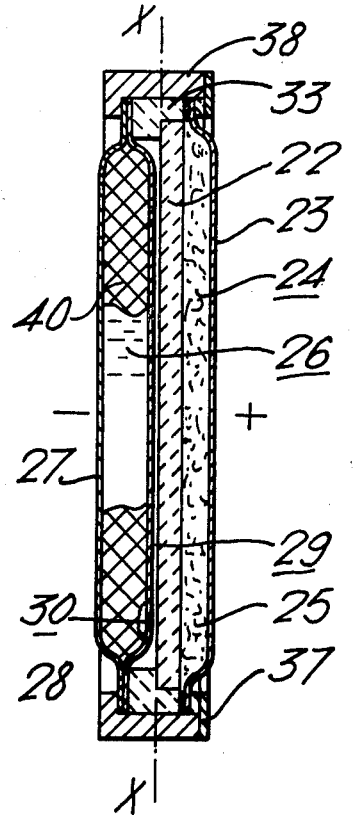
FIG. 4 shows the electric cell of FIG. 2 but with a porous foam material in a reservoir.

In order to provide a secondary containment of the liquid sodium in the aforedescribed cells, porous foam materials, such as Nichrome or Torvec ceramic, may be disposed in the reservoir, as shown, for example, in FIG. 4 to which reference is now made.

The cell shown in FIG. 4 is identical to the cell shown in FIG. 2, but has porous material 40 disposed in the reservoir 26 so as substantially to fill the reservoir.

It will be appreciated that to maintain the integrity of the electric cell in the event of damage to the solid electrolyte, metallic components which might be reached by hot polysulphides, for example, the heat and corrosion resistant barrier, should preferably be made from a suitable corrosion resistant material such as molybdenum, or be protected with a suitable heat and corrosion resistant coating such as mixed alumina and titania.

We claim:

1. An electric cell having a solid electrolyte which partially bounds on one side thereof a compartment for a liquid cathode and on the opposite side thereof a compartment in the form of a wicking space for a liquid anode, said wicking space being shaped so that said space generally follows the contour of the surface of the solid electrolyte and is capable of containing only a very limited quantity of the liquid anode needed by the cell, and a reservoir for storing the bulk of the liquid anode needed for the cell, wherein the improvement comprises a corrosion resistant barrier between the solid electrolyte and the reservoir and separating one from the other, and a flow limiting means, through which liquid anode in the reservoir must flow to reach the liquid anode compartment and the solid electrolyte, for permitting flow therethrough of liquid anode for the normal charge and discharge operational requirements of the cell but limiting higher rates of flow such that in the event of damage to the solid electrolyte only a very limited quantity of liquid anode is readily available to react with the liquid cathode, and further supply of liquid anode is limited by the flow limiting means.

2. An electric cell as claimed in claim 1, wherein a porous foam material which is resistant to corrosion by the liquid anode is disposed in the reservoir so as substantially to fill the reservoir.

3. An electric cell as claimed in claim 1, wherein the solid electrolyte is of tubular form, the corrosion resistant barrier is also of tubular form and is disposed concentric to the solid electrolyte to define on one side the liquid anode compartment therebetween, the other side of said barrier partially bounds the reservoir for liquid anode, and port means in said barrier provide the flow limiting means.

4. An electric cell as claimed in claim 3, wherein the corrosion resistant barrier is disposed around the outside of the tubular solid electrolyte to define a compartment for liquid anode therebetween, a casing is disposed around the corrosion resistant barrier to define the reservoir therebetween, the compartment for the liquid cathode is provided by the space inside the tubular solid electrolyte, and a current collecting means extends into and along the length of the liquid cathode compartment.

5. An electric cell as claimed in claim 1, wherein a capsule defines the reservoir and is disposed adjacent to the solid electrolyte to define the compartment for liquid anode therebetween, a port means in the capsule provides the flow limiting means, and the capsule also provides a corrosion resistant barrier between the reservoir therein and the liquid anode compartment.

6. An electric cell as claimed in claim 5, wherein the capsule and the solid electrolyte are of flat form.

7. An electric cell of tubular form of between 250 to 400 watt.hrs. energy capacity and adapted for operation in a vertical orientation, comprising a solid electrolyte of tubular form which is closed at its lower end and of 3 cm mean diameter, a tubular stainless steel casing closed at one end and having an external flange at its open end through which the solid electrolyte is disposed lengthwise, a corrosion resistant barrier in the form of a molybdenum tube partially closed at its lower end and disposed around the outside of the solid electrolyte to define a liquid anode compartment therebetween and a liquid anode reservoir therebetween the casing, the inside dimensions of the corrosion resistant barrier relative to the outside dimensions of the solid electrolyte being selected so that the barrier defines a substantially constant distance normal to and about the surface of the solid electrolyte of between 0.1 mm and 0.5 mm depending on the energy capacity of the cell to provide a liquid anode compartment of very limited capacity and such that it constrains liquid sodium therein to flow by capillary action over the surface of the solid electrolyte, an aperture of between 1½ mm and 3 mm at the otherwise closed end of the barrier to provide a flow limiting means for flow therethrough of liquid sodium between the liquid sodium compartment and the reservoir, the smallest aperture and largest said normal distance being selected for the cell of 250 watt.hr. energy capacity and vice versa, a current collecting means in the form of a graphite rod extending substantially concentrically into and along the length of the solid electrolyte and terminating at one end near the closed end of said solid electrolyte, liquid sulphur impregnated in a graphite felt and disposed inside the solid electrolyte between the surface thereof and the current collecting means, a ceramic spacer disc of annular form to which the solid electrolyte and barrier are formed at their open ends and such that said spacer disc closes the liquid anode compartment and the reservoir, a stainless steel closure disc disposed above the spacer disc to close the liquid sulphur compartment and which mechanically supports and electrically connects the other end of the current collecting means through screw thread means, Grafoil sealing means disposed between the flange of the casing and the ceramic spacer and between the ceramic spacer and the closure disc, an alpha-alumina insulating disc of annular form disposed on the upper surface of the closure disc, an internally threaded sleeve which fits around said flange, spacer disc, closure disc and insulating disc and has an inturned lip which abuts the lower surface of the flange of the casing, and an externally threaded insert which engages the screw thread in the sleeve above the insulating disc so that when tightened it clamps the flange, spacer disc and closure disc in sealing engagement and thereby seals the liquid anode and liquid cathode compartments.

8. An electric cell as claimed in claim 7, wherein porous foam Nichrome is disposed in the reservoir so as substantially to fill the reservoir.

* * * * *